O. P. Macgill,
Horseshoe.
No 2,560. Reissued Apr. 16, 1867.
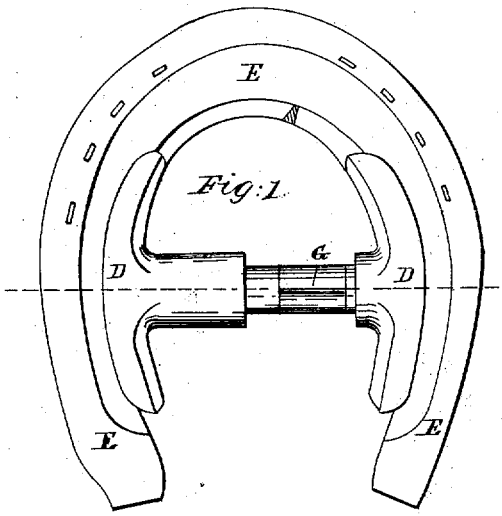
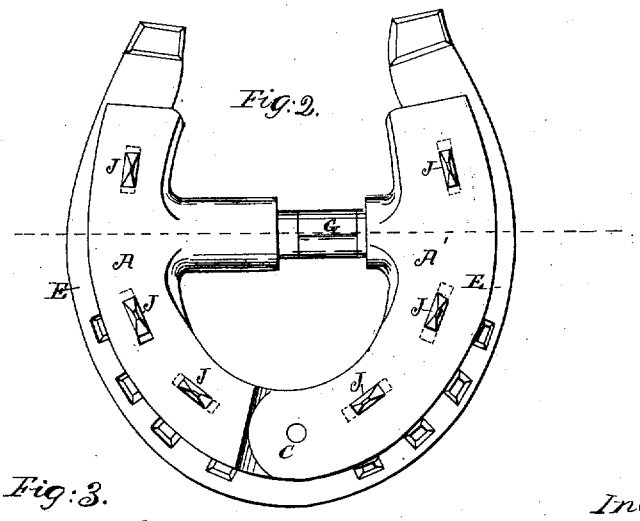
Fig: 3.
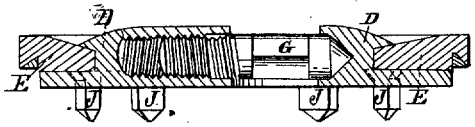
Witnesses:
E. D. Smith.
Alex. A. B. Hanch.
Inventor:
O. P. Macgill
By Munn & Co
Attorneys.
N. PETERS, PHOTO-LITHOGRAPHER, WASHINGTON, D. C.

UNITED STATES PATENT OFFICE.

OLIVER P. MACGILL, OF BROOKLANDVILLE, MARYLAND, ASSIGNOR TO HIMSELF AND T. POULTNEY.

IMPROVEMENT IN HORSESHOES.

Specification forming part of Letters Patent No. 47,242, dated April 11, 1865; Reissue No. 2,560, dated April 16, 1867.

*To all whom it may concern:*

Be it known that I, OLIVER P. MACGILL, of Brooklandville, Maryland, have invented an Improvement in Horseshoes, of which the following is a specification.

To adapt the shoeing of a horse to the variable conditions of travel, or, in other words, to have him either "rough-shod" or "smooth-shod," as occasion may require, without reshoeing or removing the shoes of the animal, (involving the many objections so well known to every horseman, such as danger of injury to the horse's foot, expense, loss of time, &c.,) has long been deemed a great desideratum, and a great variety of methods have been suggested of so constructing the horseshoe and so combining with it or adapting to it removable devices that the character of the shoes might be changed, without removing them, from smooth to rough, and vice versa, in order that the character of the horse's shoes might always be readily adapted to the character of the surface over which he might be required to travel; but to the best of my knowledge all of the many plans heretofore suggested involve serious objections in practice—such, for instance, as too great complication, costliness, requirement of too great mechanical skill in the use of them, liability to derangement, imperfect operation, and other practical objections. To overcome these objections and provide a plan of effectually changing the character of the horse's shoes, which shall at once be successful, economic, expeditious, and in every way perfectly practical and desirable, is the object of my invention, which consists in a false shoe or frame provided with suitable sharp projections or "ice-calks" so constructed that it may be expeditiously and securely clamped to and readily removed from the ordinary smooth horseshoe, as will be hereinafter more fully described; and my invention further consists in making the said frame or false shoe of two pieces hinged together, in combination with flanges, to take hold of the edge of the ordinary horseshoe, and a single screw so arranged as to expand the hinged portions, with their flanges, against the edges of the shoe, all as hereinafter more fully explained; and my invention further consists in having the ice-calks of the false shoe so applied that when the latter is not attached to the horse's shoe they may be readily removed for sharpening, &c., as will be presently more fully explained.

To enable those skilled in the art to make and use my invention, I will proceed to describe the construction and operation of the devices, referring by letters to the accompanying drawings, in which—

Figure 1 is a top or plan view showing my false shoe as attached to an ordinary horseshoe. Fig. 2 is a bottom view of the same parts; and Fig. 3 is a vertical cross-section taken at the line *x x*, Fig. 2.

In all the figures the false shoe is represented as secured to the horse's shoe, and to more clearly illustrate, the horse's shoe is drawn in red, while the false (or "roughing") shoe is drawn in black lines.

Similar letters designate the same part in the several figures.

E represents an ordinary (smooth) horseshoe.

A A is the false shoe, which may be made in two parts hinged together at *c*, (near the toe of the horseshoe.) This false shoe A A is formed or provided with ribs or flange-like portions D D, in such manner that when the said false shoe is placed on the horse's shoe, as seen at Fig. 2, the said flanges D D will lap over the inner top edge of the shoe E, as seen at Figs. 1 and 3.

H H are projections formed on the inner edges (and opposite to each other) of the false shoe A A, into which pass the ends of a set-screw, G, one of said lugs or projections H being tapped to receive the threaded portion of said screw G, and the other being countersunk to receive the pointed end of said screw, as clearly shown at Fig. 3. The false shoe A A is perforated by oblong holes or slots I I I, &c., which are chamfered off on that surface of said shoe which comes against the shoe E, and into these holes I are fitted and placed "ice-calks" or "roughing" points J J, &c. (See Figs. 2 and 3.) These points J may be made of steel, of the proper shape, at the outer or projecting portions, and are formed with nail-like heads, (corresponding to the chamfered slots in A A′,)

so that they may be placed into and through the slots I, (from the upper side of A A′,) and will be retained in position (when the false shoe is placed on shoe E) in one direction by virtue of their heads in the slots I, and in the other direction by virtue of their contact with the under surface of shoe E.

The operation of the apparatus or its application to the horse's shoe will be readily understood with little explanation after what has been said hereinbefore.

When it is desired to "rough" the horse, (who is supposed to have on an ordinary smooth shoe, such as shown at E,) the false shoe A A (with its calks J fitted or placed in it) is placed up against the bottom surface of shoe E by turning in the screw G, so that the parts A A′ may be vibrated toward each other (on pivot *c*) until the projections or flanges D D will pass by the inner edge of shoe E. The screw G is then out, (or unscrewed,) and the parts A A′ thereby distended or moved away from each other (turning on pivot *c*) until the flanges D D lap over the inner edges of shoe E, and the latter is confined between said flanges D and the portions A A, as clearly shown in the drawings. (See Fig. 3.) In this manner it will be seen the false shoe, with its attachments, is securely clamped to the shoe E on the horse's foot without being screwed into any part of the shoe E, and without having any puncturing or previous preparation of the ordinary horse-shoe, (which it is required to make rough.)

It will be understood that an apparatus or contrivance such as described, while it is exceedingly simple and economic in its construction and manufacture, may be applied by any unskilled person in a secure and reliable manner, and very expeditiously, to any ordinary horse's shoe, (of the right size,) and that it can be removed from the horse's foot with equal facility.

By making the ice-calks J removable and arranging them in the plates A A′, as shown and described, the advantage of taking them out and sharpening them separately or removing a portion of them is gained, though of course they might be formed on or permanently united to plates A A, if deemed expedient, without losing the main advantages of my invention.

The false shoes may be manufactured of cast or malleable iron, (and the points J of steel,) of various sizes required.

It will be seen that by making the false shoe in two pieces hinged together I am enabled to dispense with any flange or clip or other projection extending over or gripping the outer edge of the shoe E anywhere, and make the single screw G clamp the entirely false shoe securely to the shoe E.

I am aware that an apparatus has been devised to clamp onto the shoe, consisting of cross and longitudinal braces or rods drawn together by a screw, as shown in the patent of Pierce Thiry, July 22, 1862, and I do not wish to be understood as laying claim to any such apparatus; but

What I claim as new, and desire to secure by Letters Patent, is—

1. A false or supplemental shoe provided with ice-calks, and so constructed that it may be clamped to or confined upon the shoe of the horse by means of gripping-flanges and a clamping-screw without the necessity of any screws, keys, or other devices entering the stock or metal of the shoe on the horse's foot.

2. Making the supplemental shoe in two parts hinged together, in combination with the flanges D D, or their equivalents, and the tightening-screw, in order that the said shoe may be clamped only to the inner edges or portions of the shoe of the horse, substantially as described.

3. Making the ice-calks J removable, and constructed and combined with the false shoe in the manner described, for the purposes set forth.

In testimony whereof I have hereunto set my hand and seal this 5th day of February, 1867.

O. P. MACGILL. [L. S.]

In presence of—
D. B. TRIMBLE,
J. R. RUMIS, Jr.